US008661443B2

(12) United States Patent
Potkonjak (10) Patent No.: US 8,661,443 B2
(45) Date of Patent: Feb. 25, 2014

(54) SCHEDULING AND/OR ORGANIZING TASK EXECUTION FOR A TARGET COMPUTING PLATFORM

(75) Inventor: Miodrag Potkonjak, Los Angeles, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 391 days.

(21) Appl. No.: 12/426,139

(22) Filed: Apr. 17, 2009

(65) Prior Publication Data
US 2010/0269116 A1   Oct. 21, 2010

(51) Int. Cl.
*G06F 9/46* (2006.01)

(52) U.S. Cl.
USPC .......................................... 718/102; 718/104

(58) Field of Classification Search
USPC ......................................................... 718/100
See application file for complete search history.

(56) References Cited

U.S. PATENT DOCUMENTS

| | | | | |
|---|---|---|---|---|
| 5,814,845 A | * | 9/1998 | Carley | 257/207 |
| 7,971,073 B2 | * | 6/2011 | Hsu et al. | 713/300 |
| 2005/0138452 A1 | | 6/2005 | Misaka et al. | |
| 2010/0241892 A1 | | 9/2010 | Potkonjak | |
| 2010/0287404 A1 | | 11/2010 | Potkonjak | |
| 2010/0287409 A1 | | 11/2010 | Potkonjak | |

FOREIGN PATENT DOCUMENTS

| | | | |
|---|---|---|---|
| JP | 2003140787 A | 5/2003 | |
| JP | 2005-182223 A | 7/2005 | |
| JP | 2005222536 A | 8/2005 | |

OTHER PUBLICATIONS

Chandrakasan, A. P. et al., "Optimizing Power Using Transformations," IEEE Transactions on Computer-Aided Design of Integrated Circuits and Systems, Jan. 1995, pp. 12-31, vol. 14, No. 1.
Hong, I. et al., "Power Optimization of Variable-Voltage Core-Based Systems," IEEE Transactions on Computer-Aided Design of Integrated Circuits and Systems, Dec. 1999, pp. 1702-1714, vol. 18, No. 12.
Qu, G. et al., "Techniques for Energy-Efficient Communication Pipeline Design," IEEE Transactions on Very Large Scale Integration (VSLI) Systems, Oct. 2002, pp. 542-549, vol. 10, No. 5.
Wong, J. L. et al., "Power minimization in QoS sensitive systems," IEEE Transactions on Very Large Scale Integration (VSLI) Systems, Jun. 2004, pp. 553-561, vol. 12, No. 6.

(Continued)

*Primary Examiner* — Meng An
*Assistant Examiner* — Wissam Rashid
(74) *Attorney, Agent, or Firm* — Moritt Hock & Hamroff LLP; Steven S. Rubin, Esq.

(57) ABSTRACT

Techniques are generally described relating to methods, apparatuses and articles of manufactures for scheduling and/or organizing execution of tasks on a computing platform. In various embodiments, the method may include identifying successively one or more critical time intervals, and scheduling and/or organizing task execution for each of the one or more identified critical time intervals. In various embodiments, one or more tasks to be executed may be scheduled to execute based in part on their execution completion deadlines. In various embodiments, organizing one or more tasks to execute may include selecting a virtual operating mode of the platform using multiple operating speeds lying on a convexity energy-speed envelope of the platform. Intra-task delay caused by switching operating mode may be considered. Other embodiments may also be described and/or claimed.

12 Claims, 5 Drawing Sheets

(56) References Cited

OTHER PUBLICATIONS

Kirovski, D. et al., "System-Level Synthesis of Low-Power Hard Real-Time Systems," Design Automation Conference, Jun. 1997, pp. 697-702.

Hong, I. et al., "Power Optimization using Divide-and-Conquer Techniques for Minimization of the Number of Operations," International Conference on Computer-Aided Design, 1997, pp. 108-111.

Shin, D. et al., "Low-energy intra-task voltage scheduling using static timing analysis," Design Automation Conference, Jun. 18, 2001, pp. 438-443.

Hong, I. et al., "On-Line Scheduling of Hard Real-Time Tasks on Variable Voltage Processor," International Conference on Computer-Aided Design, 1998, pp. 653-656.

Hong, I. et al., "Synthesis Techniques for Low-Power Hard Real-Time Systems on Variable-Voltage Processor," Real-Time System Symposium, 1998, pp. 178-187.

Dabiri, F. et al., "Energy minimization for real-time systems with non-convex and discrete operation modes," Date Conference, 2009, pp. 1416-1421.

Alkabani, Y. et al., "N-version temperature-aware scheduling and binding," International Symposium on Low Power Electronics and Design, Aug. 19, 2009, pp. 331-334.

Vahdatpour, A. et al, "Leakage Minimization Using Self Sensing and Thermal Management," International Symposium on Low Power Electronics and Design, Aug. 18, 2010, pp. 265-270.

Pillai, P. et al., "Real-time dynamic voltage scaling for low-power embedded operating systems," SIGOPS Oper. Syst. Rev., 2001, pp. 89-102, vol. 35, No. 5.

Andrei, A. et al., "Overhead-Conscious Voltage Selection for Dynamic and Leakage Energy Reduction of Time-Constrained Systems," Design, automation and Test in Europe Conference and Exhibition, 2004, 6 pages, vol. 1.

Chandrakasan, A. P. et al., "Hyper-LP: A System for Power Minimization Using Architectural Transformations," International Conference on Computer-Aided Design, 1992, pp. 300-303.

Rotenberg, E., Using Vairable-MHz Microprocessors to Efficiently Handle Uncertainty in Real-Time Systems, Microarchitecture 2001 MICRO-34. Proceedings. 34th ACM/IEEE International Symposium on, US, Dec. 5, 2001, 28-39.

Japan Office Action for Japanese patent application No. 2009-287077, Dated 2012, 4 pages.

English Translation of Japan Office Action for Japanese patent application No. 2009-287077, Dated 2012, 7 pages.

Office action issued by Japanese Patent Office in a corresponding Japanese patent application 2009-287077, 2 pages.

Machine translation of reference JP 2005-222536 cited by the Japanese Patent Office in a corresponding Japanese patent application 2009-287077, 2005, 44 pages.

Machine translation of reference JP 2003-140787 cited by the Japanese Patent Office in a corresponding Japanese patent application 2009-287077, 2003, 14 pages.

Rotenberg, E., Using variable-MHz microprocessors to efficiently handle uncertainty in real-time systems, MICRO-34, Proceedings of the 34th ACM/IEEE International Symposium on Microarchitecture, Dec. 1-5, 2001, pp. 28-39.

\* cited by examiner

600 An article of manufacture having a computer program product 632 a computer readable storage medium 634 Instructions to schedule execution of tasks on a target computing platform one or more instructions for identifying a critical time interval;
one or more instructions for scheduling task executions for the critical time interval; and/or
one or more instructions for conditionally repeating the identifying and scheduleing.

FIGURE 6

SCHEDULING AND/OR ORGANIZING TASK EXECUTION FOR A TARGET COMPUTING PLATFORM

BACKGROUND

Energy consumption is often recognized as one of the most important parameters in designing modern portable electronic and wireless systems in today's very large scale integration (VLSI) circuit design. Among the various low power techniques at different levels of abstraction, dynamic voltage scheduling (DVS) is an often used technique for reducing power and energy consumption during system operation. DVS aims at reducing the dynamic/static power consumption by scaling down operational frequency and circuit supply voltage. In has been demonstrated that dynamic energy savings can be accomplished by simultaneously varying the supply voltage ($V_{dd}$) and the threshold voltage ($V_t$) through adaptive body biasing. Several researches have been performed to solve task-scheduling on DVS-enabled systems to achieve dynamic energy reduction. For example, heuristics have been proposed for periodic tasks in a multiprocessor.

Research to-date on energy consumption has also increasingly focus on leakage energy. As device sizes continue to decrease due to advances in technological manufacturablity, leakage energy dissipation is becoming more and more important. For the 70-nm process, leakage power is smaller than dynamic power, for the 50-nm process, they become comparable, while for the 35-nm process, leakage power is larger than dynamic power. Hence, it is often predicted that in less than a decade, leakage power will dominate in any energy consumption consideration.

However, low power research has traditionally focused on a power model where the relationship between power consumption and processor speed is convex. Convexity has a number of ramifications when energy is minimized using variable voltage strategies. Chief among them may be the assumption that with respect to energy consumption, it is optimal to execute a task with the executing processor operating at a constant speed. However, the union of several technological, integrated circuits, architectural, operating systems, and application factors is increasingly creating systems where the mapping from the speed of execution (that is the inverse of the time required to complete one cycle and execute an operation) and energy consumption per operation (ES) is non-convex. Non-convex energy-speed models will dominate the wide spectrum of pending and future energy-sensitive systems. For example, in heterogeneous multiprocessor multicore system-on-chips, different cores have different ES functions and the overall relationship between processor speed and energy per operation is not convex. Likewise, total leakage and dynamic energy does not have a convex relationship with processor speed, as leakage current increases when threshold voltage is lowered to increase the processor speed. Incorporation of new high bandwidth on-chip interconnect technologies, such as nanowires, RF, photonic crystals-based optical interconnect, and plasmonics communication networks compounded with a need for thermal management will have further ramifications on the non-convex ES relationship. Instruction level parallelism and effective speed also has a highly non-convex and non-continuous function. Hence, simplified convex energy models assumed in traditional approaches for tackling DVS problem may no longer be effective.

Attempts have been made to develop non-convex methods to achieve energy consumption reduction. DVS techniques in the presence of discrete voltage levels for quadratics power models have been proposed. However, the present disclosure identified that a number of these approaches do not appear optimal and are complex, requiring substantial computing.

Further, the present disclosure appreciates that scaling the supply voltage in order to reduce the power consumption has a side-effect on the circuit delay and hence the operational frequency. Each time a processor's supply voltage is switched, the change requires a certain amount of extra energy and time. Thus, the present disclosure identifies that transition overhead is another important issue that should be considered, but has been ignored in conventional voltage scaling techniques.

BRIEF DESCRIPTION OF THE DRAWINGS

Subject matter is particularly pointed out and distinctly claimed in the concluding portion of the specification. The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. Various embodiments will be described referencing the accompanying drawings in which like references denote similar elements, and in which:

DETAILED DESCRIPTION

The following description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to scheduling task execution on a target computing platform.

Figure 1:
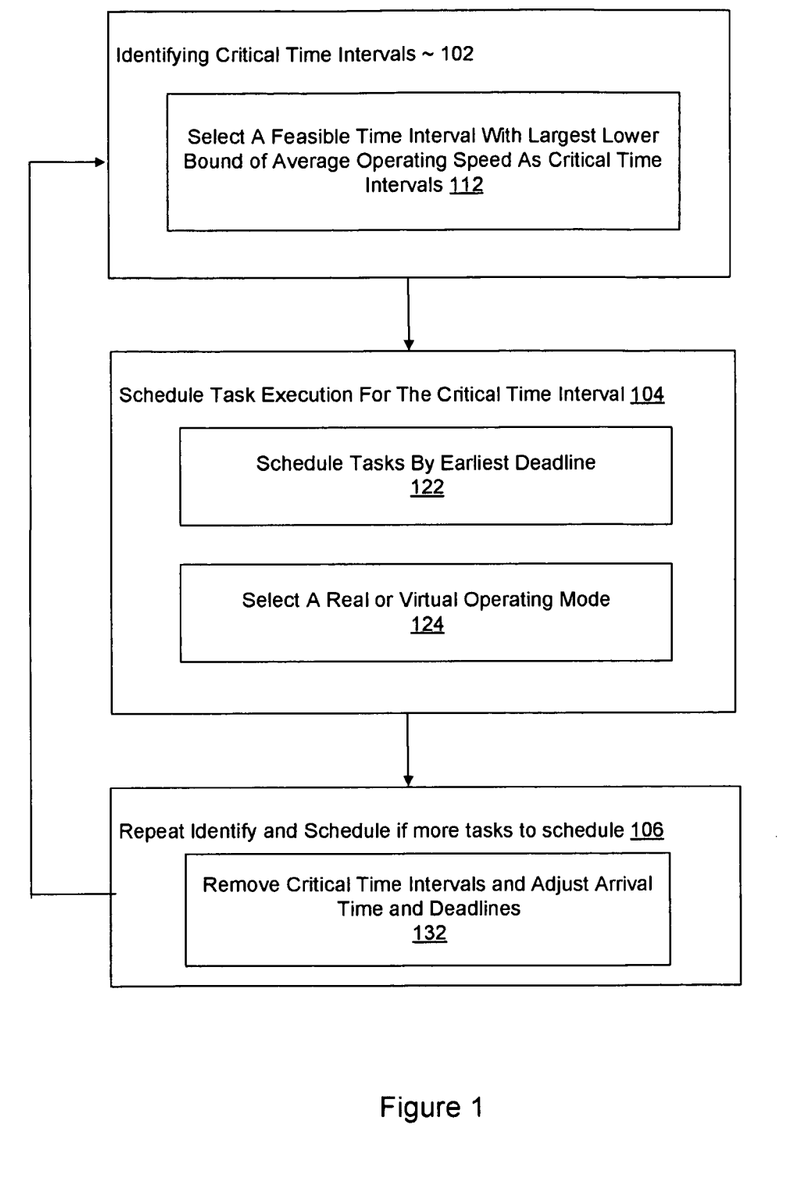
FIG. 1 illustrates a method for scheduling and/or organizing task executions on a target computing platform, in accordance with various embodiments.

FIG. 1 illustrates a method 100 for scheduling and/or organizing task executions on a target computing platform, in accordance with various embodiments of the present disclosure. As will be described in more details below, method 100 may optimally schedule execution of tasks on a target computing platform, reducing or minimizing an amount of energy consumed in executing the task. For the purpose of the present disclosure, the set of tasks to be scheduled for execution may be represented by J={$\tau_1, \ldots, \tau_n$}. Each task may be characterized by $\tau_i$=($a_i, b_i, R_i, C_i$), where $a_i$ is the arrival time of task i $b_i$ is the execution completion deadline (or simply, deadline) of task i $R_i$ is the required clock cycles of the target computing platform to process or execute task i $C_i$ is the average switching capacity of the target computing platform of task i.

The target computing platform may be characterized by their operation modes[1], $\Xi$={$m_1, \ldots, m_k$}, where each mode is a pair $m_j$=($e_j, s_j$), where $e_j$ is the energy consumption per clock cycle in the $j^{th}$ mode $s_j$ is the processor speed when running in the $j^{th}$ mode

[1]In the present disclosure the term 'operation mode' is used rather than 'supply voltage' or 'speed'. The reason is because current technologies can reduce energy dissipation not only by changing supply voltage, but also by reducing bias-voltage.

Thus, the problem of optimally scheduling the set of tasks for execution on the target computing platform, reducing or minimizing the amount of energy consumed in executing the set of tasks, may be considered as the problem of $$\text{minimize} \int_O^T P(\xi(t)) dt \quad (1)$$

where P( ) is a power consumption function, and $\xi$(t) is a mapping function defining the processor mode and the scheduled task at time t.

Equation (1) may be restated from the perspective of the amount of clock cycles required to execute the tasks, i.e., $$\text{minimize} \sum_O^R e(s_i) \Delta R \quad (2)$$

Accordingly, solving the problem may be considered as finding the mapping function $\chi$(t) that defines the scheduled task at time t, such that the total energy consumption during the [0,T] period is minimized or reduced to a desired level.

According to embodiment of the present disclosure, method 100 may include one or more functions or processing operations illustrated by blocks 102, 104 and/or 106. As illustrated, processing may start at block 102, identifying critical time interval, where a first critical time interval [a, b] of the [0,T] period is identified. From block 102, method 100 may proceed to block 104, schedule task execution for the critical time interval, where the tasks to be executed during the critical time interval are scheduled and/or organized (hereinafter, simply "schedule"). From block 104, method 100 may proceed to block 106, repeat identify and schedule if more tasks to schedule. At block 106, method 100 may determine whether there are further tasks remain to be scheduled, and if so, method 100 repeat blocks 102 and 104. The process may continue until all tasks are scheduled.

In various embodiments, as illustrated, identifying critical time intervals at block 102 may include selecting a feasible time interval with the largest lower bound average operating speed as the critical time interval, block 112. In various embodiments, the [0,] period may be considered as having a number of feasible time intervals, and identifying critical time interval 102 comprises selecting one of these feasible time intervals. In various embodiments, each of the feasible time intervals has an average operating speed, which is the average operating speed needed to execute the tasks to be executed during the feasible time interval. Further, each of the feasible time intervals has a lower bound average operating speed, to be described in more detail below. And the selecting may be based at least in part on these lower bounds, more specifically, the feasible time interval with the largest lower bound average operating speed may be selected as the critical time interval.

Continuing to refer to FIG. 1, block 104, schedule task execution for the critical time period, may include schedule task by earliest deadline, block 122, and select a real or virtual operating mode, block 124. At block 122, method 100 may schedule the tasks to be executed during the critical time interval by the order of the tasks' execution completion deadlines, that is, a task with an earlier execution completion deadline is scheduled for execution before another task with a later execution completion deadline. At block 124, method 100 may conditionally select either a real or a virtual operating mode for the critical time interval. In various embodiments, the real or virtual operating mode may be selected as follows:

$$\text{if } s_{\delta}^* = \frac{b-a}{b-a-\delta ij} s^* < s_2 \quad (3)$$

$$t_1 = \frac{s2 - s*\delta}{s2 - s1} \times (b-a)$$

$$t_2 = \frac{s*\delta - s1}{s2 - s1} \times (b-a)$$

else if $s_{\delta}^* \geq s_2$ $t_1 = 0$ $$t_2 = \frac{s^*}{s2} \times (b-a) \qquad (4)$$

where $s_1$ and $s_2$ are two respective operating speeds of two operating modes;

$s^*$ is the virtual operating speed achieved by operating at $s_1$ and $s_2$ for time $t_1$ and $t_2$ respectively, $\delta_{ij}$ is a delay incurred by the scheduled task as it becomes idle, when the computing platform switches from operating mode i to operating mode j, and $s^*_\delta$ is the virtual operating speed having taken into consideration $\delta_{ij}$.

As will be described in more details below, in various embodiments, $s_1$ and $s_2$ may be two respective operating speeds of two operating modes on a convexity envelope of the energy and speed relationship of the target computing platform (also may be referred to as convexity energy-speed envelope).

Still referring to FIG. 1, block 106, repeat identify and schedule if more tasks to schedule, may include remove critical time interval and adjust arrival times and execution completion deadlines, block 132. At block 132, method 100 may remove the immediately identified critical time interval (with tasks to be executed during the interval now scheduled) from [0,T] period, and adjust the arrival times and execution completion deadlines to reflect the removal of the immediately identified critical time interval, to effectively reformulate the problem for another iteration. As an example, if [0,T] spans a 60 min period, and the immediate identified critical time period was identified to be the $41^{st}$ to $45^{th}$ minute, after having their tasks scheduled, the $41^{st}$ to $45^{th}$ minute interval is removed from the [0,T] period, with the task arrival times and/or execution completion deadlines after the $45^{th}$ minute, updated to be 15 minutes earlier, effectively reformulating the problem as a problem with a [0,T] period spanning 45 min.

Accordingly, method 100 may be not only optimally, but may efficiently, solve $\chi(t)$, which defines the scheduled task at time t such that the total energy consumption during the [0,T] period is minimized or reduced to a desired level. Further, method 100 may be independent of the energy and speed functional relationship of the target computing platform. In other words, method 100 may optimally and efficiently solve $\chi(t)$ regardless of whether the energy and speed functional relationship of the target computing platform is non-convex or convex. The reason method 100 may be optimal, and independent of the energy and speed functional relationship will be explained in the description to follow. For ease of understanding, without loss of generality (and applicability to a target computing platform), the description will be presented in terms of a processor.

Further, before presenting the description, it should be noted that while method 100 has been described thus far for scheduling a plurality of tasks, the description should not be construed as limiting method 100 to scheduling a multitude (two or more) tasks. Method 100 may be practiced in scheduling a single task. For the single task situation, there is one time interval (defined by the arrival and deadline of the single task), and by definition, the time interval is the one and only critical time interval.

First, recall a couple of relatively important overhead caused by dynamic scheduling techniques may be the delay and energy overheads. Specially, when the operation mode of a processor is changing while a task is under execution, this overhead becomes more significant because of the delay and energy dissipations resulting from memory access and recovery. Therefore, for each pair of operation modes, there are two overhead measures: $\in_{ij}$ and $\delta_{ij}$ where $\in_{ij}$ is the energy overhead when switching from mode i to j. As described earlier, $\delta_{ij}$ is the delay caused by switching operation mode, during which time, the scheduled task becomes idle.

When the mode switching is a result of supply ($V_{dd}$) and body-bias voltage ($V_{bs}$) change, the delay and energy overheads can be stated as $$\in_{ij} = C_r * V_{dd_i} - V_{dd_j} *^2 + C_s * V_{bs_i} - V_{bs_j} *^2 \qquad (5)$$

$$\delta_{ij} = \max(pv_{dd} * V_{dd_i} - V_{dd_j} *, pv_{bs} * V_{bs_i} - V_{bs_j} *) \qquad (6)$$

where $C_r$ represents power rail capacitance, and $C_s$ is the total substrate and well capacitance. Since transition times for $V_{dd}$ and $V_{bs}$ are different, the two constants $pv_{dd}$ and $pv_{bs}$ are used to calculate both time overheads independently. If there exists any other overhead in state switching, additional terms may be added to equations 5 and 6.

Therefore, the intensity of the interval [a, b], i.e., the number of clock cycles required to execute the tasks during the interval, may defined to be:

$$g(I) = \frac{\Sigma R_i}{b-a} \forall i: [a_i, b_i] \subseteq I \qquad (7)$$

which is the average speed required to execute all the tasks that are within the interval I. Accordingly, for uniform switching capacity, g(I) is the lower bound on the average speed in the interval I. For non-uniform switching capacity, g(I) may be modified accordingly to reflect the non-uniformity. For ease of understanding, the description will assume uniform switching capacity.

Thus, to find an optimal scheduling, the processor may be arranged such that the processor operates at the average speed no less that g(I) with an energy consumption which would yield to an optimal solution. Therefore, to solve this scheduling problem is to make a virtual subjective mapping of speed to energy in the [0, $s_{max}$] without compromising ($s_{max}$ is the maximum possible speed that the processor can run at). Using such a curve a processor can be considered as being virtually run at any speed.

Figure 2A:
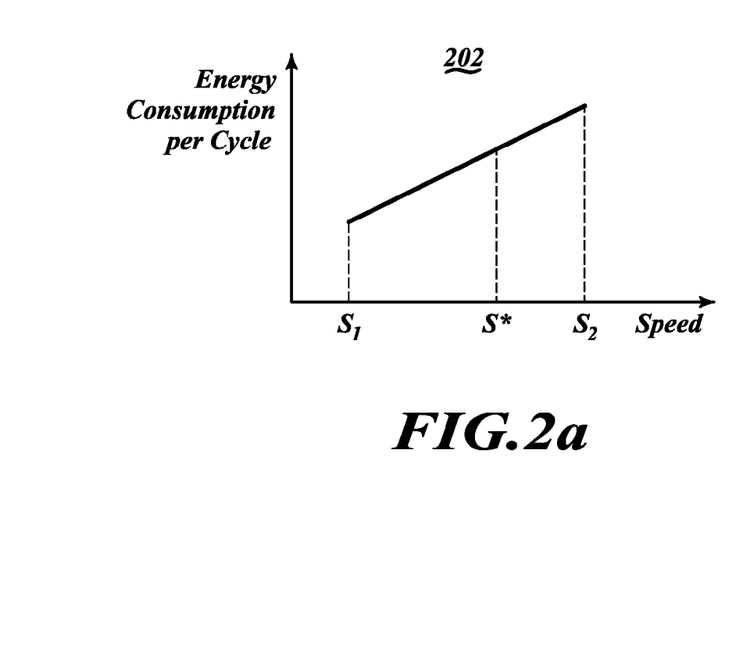
FIGS. 2a-2b illustrate how a processor may operate at any virtual operating speed, in accordance with various embodiments.

FIGS. 2a-2b illustrate how a processor may operate at any virtual operating speed, in accordance with various embodiments of the present disclosure. Assume a processor, as illustrated in FIG. 2a, has two operation modes $s_1$ and $s_2$. In order to run the processor at speed $s^*(s_1 \# s^* \# s_2)$ for a given interval [a, b], the processor may be run at $s_1$ for $t_1$ seconds and $s_2$ for $t_2$ seconds where for $t_1$ and $t_2$ meaning:

$$t_1 = \frac{s_2 - s^*}{s_2 - s_1} \times (b-a) \qquad (8)$$

$$t_2 = \frac{s^* - s_1}{s_2 - s_1} \times (b-a) \qquad (9)$$

where $s_1$ and $s_2$ are two respective operating speeds of two operating modes;

$s^*$ is the virtual operating speed achieved by operating at $s_1$ and $s_2$ for time $t_1$ and $t_2$ respectively, and $s^*$ is the virtual operating speed.

Figure 2B:
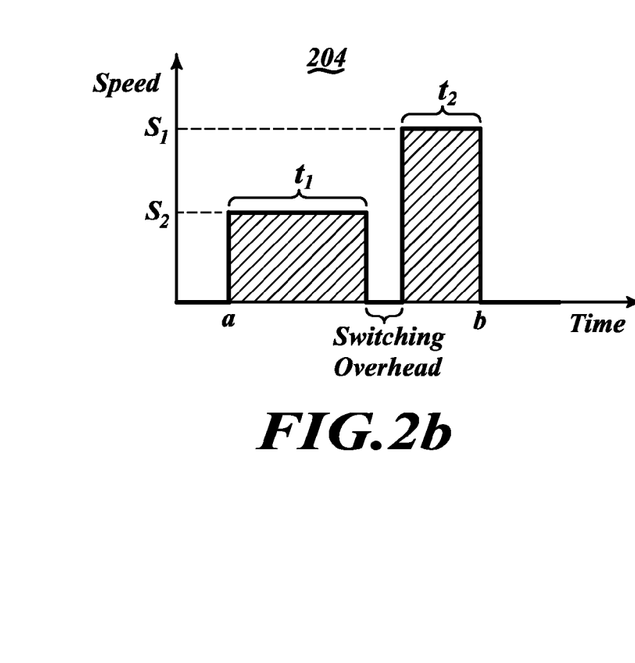

Accordingly, a processor may operate in any virtual operating speed as illustrated by graph 202 in FIG. 2a, and $t_1$ and $t_2$ may be determined using the above formulas and as illustrated by graph 204 in FIG. 2b.

Thus, when $\delta_{ij}$, a delay is incurred by the scheduled task as it becomes idle when the processor switches from operating mode i to operating mode j, the relationships between s*, $s_1$, $s_2$, $t_1$, and $t_2$ are given by equations (3) and (4) as earlier described. Equation 4 shows the case where due to switching delay overhead, the virtual speed is larger than $s_2$ and therefore the processor only runs at $s_2$ for the portion of time.

Figure 3:
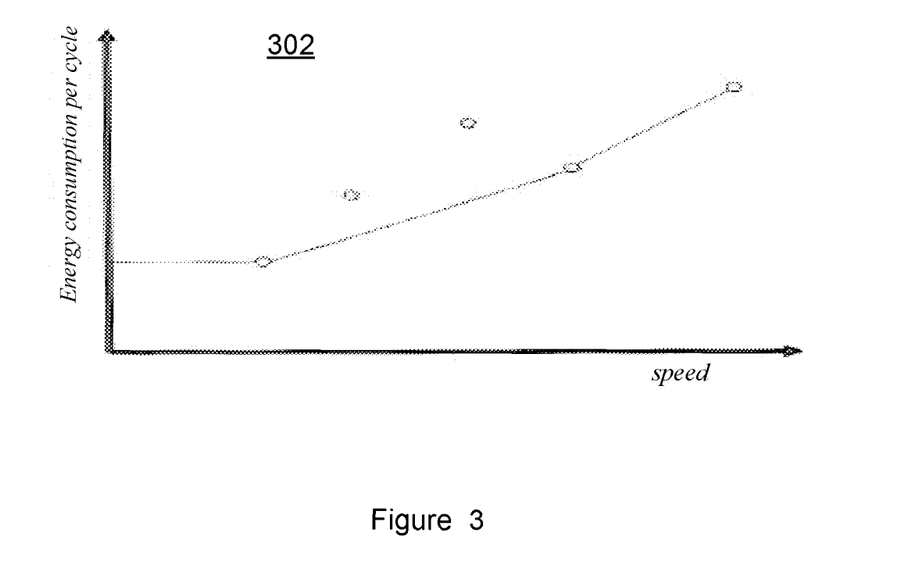
FIG. 3 illustrates a lower convex curve for an energy-speed domain, in accordance with various embodiments.

FIG. 3 illustrates a lower convex curve for an energy-speed domain, in accordance with various embodiments of the present disclosure. As illustrated, for a computing platform with a set of energy/speed operating modes, regardless whether the energy-speed functional relationship is non-convex or convex, a lower convex curve (also may be referred to as convexity energy-speed envelope) can be created, by assuming the energy consumption for the lowest operating speeds to be the same as the known energy consumption for the lowest known operating speed, that is, by extending the curve on the lower-left side to cover the entire speed axis, as illustrated by curve 302.

The points in curve 302 can be represented by $M=\{(e'_1, s'_1), \ldots, (e'_q, s'_q)\}$ sorted in non-decreasing order with respect to $s'_1$s. The resulting energy-speed curve 302 can be stated as:

$$\varepsilon_j(s) = s'_i \text{ if } 0 < s \leq s'_i \quad (10)$$

$$\varepsilon_j(s) = \frac{e'_i - e'_{i-1}}{s'_i - s'_{i-1}}(s - s'_{i-1}) + e'_{i-1} s'_{i-1} < s < s'_i \forall 1 < i \leq q$$

Figure 4:
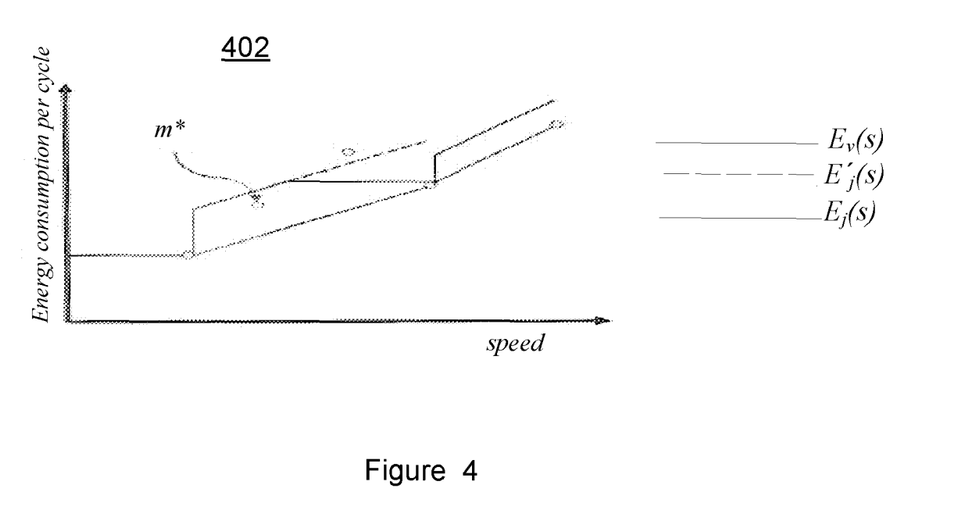
FIG. 4 illustrates a modified lower convex curve for an energy-speed domain, taking into consideration of intra-task energy overhead caused by mode switching, in accordance with various embodiments.

FIG. 4 illustrates a modified lower convex curve for an energy-speed domain, taking into consideration of intra-task energy overhead caused by mode switching, in accordance with various embodiments of the present disclosure. As illustrated, to consider the intra-task energy overhead caused by mode switching, each line segment $[(e_i, s_i), (e_j, s_j)$ in the $\epsilon_j(s)$ is replaced by $[(e_i, s_i), (e_j, s_j)+\in_{ij}]$ where $\in_{ij}$ is the normalized switching overhead, this function is called $\epsilon'_j(s)$. Applying a monotone curve fit, $\epsilon'_j(s)$ as illustrated by curve 402 may be created as follows:

$\epsilon_v(s)=e'_i \text{ if } 0<s\leq s'_1$ $\epsilon_v(s)=\min(\epsilon'_j(s), e'_i) s'_{i-1}<s<s'_i \forall 1<i\leq q$ (11)

$\epsilon_v(s)$ can potentially introduce new points in the energy-speed domain which where disregarded as a result of the construction of the lower convex curve. For example, m' is a point where as a result of energy overhead consideration, it may be used to achieve better performance. The energy-speed curve is thus modified as $M=M\cup\{m^*\}$ (considering new points such as m*). Hereinafter, this virtual energy-speed curve will be referred to as $\epsilon_v(s)$.

Interval I* is said to be critical if g(I*) is maximum for all feasible intervals in [0,T]. R* is the number of clock cycles required to execute all tasks that lie inside I*. Therefore, $I^*=[a_i, b_j]$ for some tasks $_i$ and $_j$.

Let $$s^* = g(I^*) = \frac{R^*}{(bj, ai)}.$$

Assume that in order to achieve minimum energy consumption during I*, task(s) in I* is (are) run at $S=\{s^*_1, \ldots, s^*_p\}$ for the time percentages of $(\alpha_1, \ldots, \alpha_p)$ respectively ($\Sigma$ $\alpha_i$=100%). Then according to the present disclosure, the operation modes are consecutive in $\epsilon_v(s)$.

Let the duration of $|I^*|=T$ and assume $s_q \in S$ where $s^*_i<s_q<s^*_j$ and (j-i) is minimum. In other words $s_q$ lies between two operation speeds in S and all the intermediate speeds are not in S. Adding $s_q$ to S can decrease the total energy consumption during I. Since $s^*_i<s_q<s^*_j$, there exist $\beta$ and $\gamma$ such that $$S_q = \beta s^*_i + \gamma s^*_j \quad (12)$$

Without the loss of generality, assume $\alpha_i \leq \alpha_j$. Therefore, the normalized energy consumption (i.e. per clock cycle) during $s^*_i$ and $s^*_j$ can be stated as:

$$E_{i,j} = \alpha_i e^*_i + \alpha_j e^*_j = \quad (13)$$

$$\alpha_i e^*_i + \frac{\gamma \alpha_i}{\beta} e^*_j + \frac{\alpha_j \beta - \gamma \alpha_i}{\beta} e^*_j + e_{ij} \geq \alpha_i e^*_q + \frac{\alpha_j \beta - \gamma \alpha_i}{\beta} e^*_j + e_{qj}$$

Which means that when the processor is run at $s_q$ it may reduce the energy consumption during virtual speed of $s_q$ when the processor is run at $s^*_i$ and $s^*_j$. Therefore S may contain consecutive operation modes in $\epsilon_v(s)$.

Let $s^*=g(I^*)$. If the minimum energy consumption during I*, requires running the task in I* at consecutive speeds: $S=\{s^*_1, \ldots, s^*_p\}$ for the time percentages $(\alpha_1, \ldots, \alpha_p)$ respectively then $p \leq 2$.

Assume $s^*_i<s_q<s^*_{i+1}$. For all $s^*_j<s^*_i$ the approach in the above argument can be applied here and eliminate operation at $s^*_j$ by increasing $\alpha i$ and $\alpha_{i+1}$ accordingly and reduce total power consumption during I.

Finally, in the optimal scheduling, the critical interval I* is run at virtual mode of $e(g(I^*)), g(I^*)$. If $\epsilon_v(s)$ was a convex curve the optimality would be followed. Although $\epsilon_v(s)$ is not convex in principle, it is proven that it has the convexity property. The reason why $\epsilon_v(s)$ is not visually convex is the fact that $\epsilon_v(s)$ is a conditional graph. In other words $\epsilon_v(s)$ is minimum energy consumption at different speeds when each speed is virtually achieved through one or two operation modes.

$$\epsilon_v(\alpha s_1 + (1-\alpha)s_2) \leq \alpha \epsilon_v(s_1) + (1-\alpha)\epsilon_v(s_2) \quad (14)$$

The interpretation of Equation 14 may be that energy consumption at speed $\alpha s_1 + (1-\alpha)s_2$ may be less the weighted energy consumption when the processor is running at $\alpha s_1$ and $(1-\alpha)s_2$. Therefore the overhead energy $\epsilon_{12}$ must be taken into account. According to Equation 11

$$\epsilon_v(\alpha s_1 + (1-\alpha)s_2) = \min(\alpha \epsilon_v(s_1) + (1-\alpha)\epsilon_v(s_2) + \epsilon_{12}, \epsilon_v(s_2))$$
$$\leq \alpha \epsilon_v(s_1) + (1-\alpha)\epsilon_v(s_2) + \epsilon_{12} \quad (15)$$

Equation 15 proves the correctness of the claim and the convexity of $\epsilon_v$ in use. Therefore, method 100 of FIG. 1 may yield an optimal solution, in particular, when the virtual operating mode is construed using operating modes on the convexity energy-speed envelope of a target computing platform.

Figure 5:
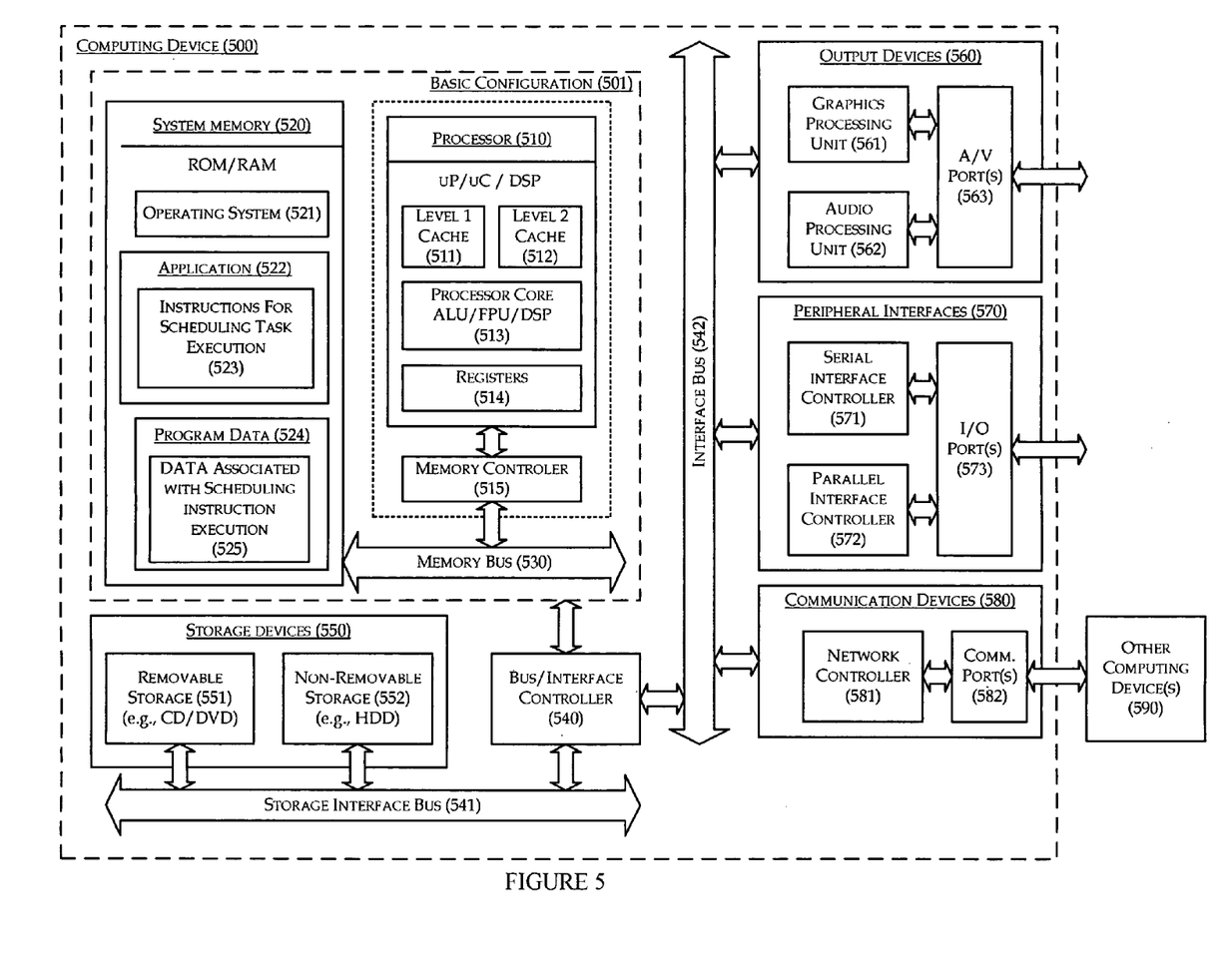
FIG. 5 is an example computer system suitable for practicing various embodiments.

FIG. 5 illustrates an example computing device, in accordance with various embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 may include one more levels of caching, such as a level one cache 511 and a level two cache 12, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include programming instructions 523 providing logic to implement the above described scheduling of task execution for one or more tasks for a target computing platform, including in particular, the selection of a virtual operating mode using operating modes lying on the convexity energy-speed envelope for the target computing platform. Program Data 524 may include the applicable data 525 associated with the scheduling operations or instruction execution.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

Figure 6:
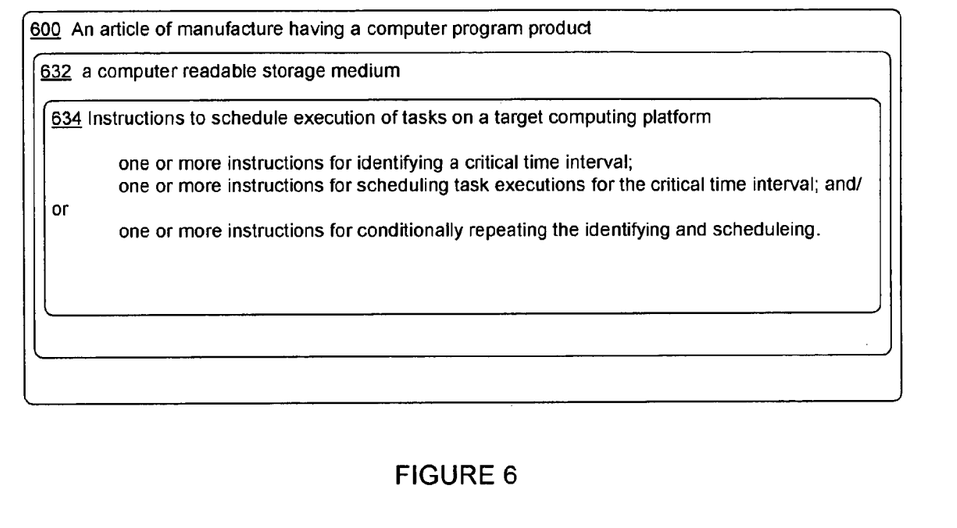
FIG. 6 is an example article of manufacture having a computer program product with instructions, all arranged in accordance with the present disclosure.

FIG. 6 illustrates an example article of manufacture having a computer program product, in accordance with various embodiments of the present disclosure. The example computer program product 600 may comprise a computer readable storage medium 632 and a plurality of programming instructions 634 stored in the computer readable medium 632. In various ones of these embodiments, the programming instructions 634 may include instructions for identifying a critical time interval. In various embodiments, programming instructions 634 may also include instructions for scheduling execution of one or more tasks to be executed during the identified critical time interval. The execution to be performed on a target computing platform. In various embodiments, the scheduling may include selection of a virtual operating mode constructed from operating modes lying on the convexity energy-speed envelope of as described earlier. In still other embodiments, programming instructions 634 may further include instructions for repeating the identifying and the scheduling for the tasks remaining to be scheduled.

Embodiments may have some or all of the instructions depicted in FIG. 6. Embodiments of computer program product 600 may have other instructions in accordance with embodiments described herein. The computer readable medium 632 may take a variety of forms including, but not limited to, volatile and persistent memory, such as, but not limited to, a compact disk (CD), a digital versatile disk (DVD), a solid-state drive, a hard drive, and so forth. Embodiments are not limited to any type or types of computer program products.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although the present disclosure has been described in terms of the above-illustrated embodiments, it will be appreciated by those of ordinary skill in the art that a wide variety of alternate and/or equivalent implementations calculated to achieve the same purposes may be substituted for the embodiments shown and described without departing from the scope of the present disclosure. Those with skill in the art will readily appreciate that embodiments in accordance with the present disclosure may be implemented in a very wide variety of embodiments. This description is intended to be regarded as illustrative instead of restrictive.

What is claimed is:

1. A method to schedule a task to be executed on a computing platform, where the computing platform is capable of operating at two or more operating speeds, the method comprising, by a processor:
    generating a convex enclosure curve at least partially based on energy consumptions for the two or more operating speeds on the computing platform;
    determining an arrival time of the task;
    determining a completion deadline of the task;
    determining respective lengths of clock cycles at the two or more operating speeds;
    determining a number of clock cycles on the computing platform to complete the task at least partially based on the respective lengths of the clock cycles;
    determining a virtual operating speed of the computing platform to perform the task before or on the completion deadline of the task to achieve a particular energy consumption at least partially based on the number of clock cycles to complete the task, wherein the virtual operating speed is achieved by operating the computing platform at a first operating speed for a first specified time and at a second operating speed for a second specified time, wherein the first, virtual and second operating speeds are on the convex enclosure curve and the virtual operating speed is higher than the first operating speed but lower than the second operating speed, wherein the first and second operating speeds of the two or more operating speeds are two closest operating speeds to the virtual operating speed;
    determining a delay incurred, where the task is idle during the delay when the computing platform switches between the first operating speed and the second operating speed; and
    scheduling the task to be executed on the computing platform at the virtual operating speed having taken into consideration the delay.

2. The method of claim 1, further comprising determining the delay by determining a power rail capacitance of the computing platform and determining a substrate and well capacitance of the computing platform.

3. The method of claim 1, further comprising calculating the virtual operating speed at least partially based on the two closest operating speeds in the convex enclosure curve operating for respective periods of time.

4. The method of claim 3, wherein the virtual operating speed is different from the two closest operating speeds on the convex enclosure curve.

5. The method of claim 1, further comprising scheduling the task to be executed at least partially based on an energy dissipated when the computing platform switches between operating at the two closest operating speeds on the convex enclosure curve.

6. The method of claim 4, further comprising scheduling the task to be executed at least partially based on an energy dissipated when the computing platform switches between operating at the two closest operating speeds on the convex enclosure curve.

7. An apparatus effective to schedule a task to be executed on a computing platform, where the computing platform is configured to operate at two or more operating speeds, the apparatus comprising:
   a memory, including instructions; and
   a processor configured to communicate with the memory, the processor effective to:
   generate a convex enclosure curve at least partially based on energy consumptions for the two or more operating speeds on the computing platform;
   determine an arrival time of the task;
   determine a completion deadline of the task;
   determine respective lengths of clock cycles at the two or more operating speeds;
   determine a number of clock cycles on the computing platform to complete the task at least partially based on the respective lengths of the clock cycles;
   determine a virtual operating speed of the computing platform to perform the task before or on the completion deadline of the task to achieve a particular energy consumption at least partially based on the number of clock cycles to complete the task, wherein the virtual operating speed is achieved by operating the computing platform at a first operating speed for a first specified time and at a second operating speed for a second specified time, wherein the first, virtual and second operating speeds are on the convex enclosure curve and the virtual operating speed is higher than the first operating speed but lower than the second operating speed, wherein the first and second operating speeds of the two or more operating speeds are two closest operating speeds to the virtual operating speed;
   determine a delay incurred, where the task is idle during the delay when the computing platform switches between the first operating speed and the second operating speed; and
   schedule the task to be executed on the computing platform at the virtual operating speed having taken into consideration the delay.

8. The apparatus of claim 7, wherein the processor is further effective to determine the delay by a determination of a power rail capacitance of the computing platform and a substrate and well capacitance of the computing platform.

9. The apparatus of claim 7, wherein the processor is further effective to calculate the virtual operating speed at least partially based on the two closest operating speeds in the convex enclosure curve in operation for respective periods of time.

10. The apparatus of claim 9, wherein the virtual operating speed is different from the two closest operating speeds on the convex enclosure curve.

11. The apparatus of claim 7, wherein the processor is further effective to schedule the task to be executed at least partially based on an energy dissipated when the computing platform switches between operation at the two closest operating speeds on the convex enclosure curve.

12. The apparatus of claim 9, wherein the processor is further effective to schedule the task to be executed at least partially based on an energy dissipated when the computing platform switches between operation at the two closest operating speeds on the convex enclosure curve.

\* \* \* \* \*

UNITED STATES PATENT AND TRADEMARK OFFICE
CERTIFICATE OF CORRECTION

PATENT NO. : 8,661,443 B2
APPLICATION NO. : 12/426139
DATED : February 25, 2014
INVENTOR(S) : Potkonjak It is certified that error appears in the above-identified patent and that said Letters Patent is hereby corrected as shown below:

On the Title Page, in item (56), under "OTHER PUBLICATIONS", in Column 2, Line 10, delete "(VSLI)" and insert -- (VLSI) --, therefor.

On the Title Page, in item (56), under "OTHER PUBLICATIONS", in Column 2, Line 12, delete "(VSLI)" and insert -- (VLSI) --, therefor.

On Title Page 2, in item (56), under "OTHER PUBLICATIONS", in Column 2, Line 8, delete "vairable-MHz" and insert -- variable-MHz --, therefor.

In the Drawings:

In Fig. 5, Sheet 4 of 5, in Box "515", in Line 1, delete "CONTROLER" and insert -- CONTROLLER --, therefor.

In Fig. 6, Sheet 5 of 5, in Box "634", in Line 5, delete "scheduleing." and insert -- scheduling --, therefor.

In the Specification:

In Column 1, Line 24, delete "manufacturablity," and insert -- manufacturability, --, therefor.

In Column 3, Line 48, delete "mode" and insert -- mode. --, therefor.

In Column 4, Line 31, delete "[0,]" and insert -- [0,T] --, therefor.

In Column 11, Line 43, delete "and or" and insert -- and/or --, therefor.

Signed and Sealed this
Fifteenth Day of July, 2014

Michelle K. Lee
*Deputy Director of the United States Patent and Trademark Office*